United States Patent
Murray

(10) Patent No.: US 11,252,064 B2
(45) Date of Patent: Feb. 15, 2022

(54) SYSTEM AND METHOD FOR MONITORING INGRESS/EGRESS PACKETS AT A NETWORK DEVICE

(71) Applicant: Hewlett Packard Enterprise Development LP, Houston, TX (US)

(72) Inventor: Christopher S. Murray, Boynton Beach, FL (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/918,870

(22) Filed: Jul. 1, 2020

(65) Prior Publication Data

US 2022/0006712 A1 Jan. 6, 2022

(51) Int. Cl.
*G06F 15/16* (2006.01)
*H04L 12/26* (2006.01)
*H04L 29/08* (2006.01)

(52) U.S. Cl.
CPC ........ *H04L 43/062* (2013.01); *H04L 43/0876* (2013.01); *H04L 67/1095* (2013.01); *H04L 2212/00* (2013.01)

(58) Field of Classification Search
CPC ... H04L 43/062; H04L 43/0876; H04L 43/06; H04L 67/1095; H04L 2212/00
USPC ......................................................... 370/252
See application file for complete search history.

(56) References Cited

U.S. PATENT DOCUMENTS

| | | | |
|---|---|---|---|
| 8,170,025 B2 | 5/2012 | Kloth et al. | |
| 8,599,747 B1* | 12/2013 | Saleem | H04L 63/306 370/321 |
| 9,166,992 B1* | 10/2015 | Stickle | H04L 63/1425 |
| 9,455,935 B2 | 9/2016 | Yu et al. | |
| 9,503,342 B2 | 11/2016 | Scott et al. | |
| 10,791,132 B1* | 9/2020 | Power | H04L 63/1416 |
| 10,887,361 B2* | 1/2021 | Jiang | H04L 43/08 |
| 2008/0285452 A1* | 11/2008 | Oran | H04L 43/00 370/235 |
| 2016/0094418 A1* | 3/2016 | Raney | H04L 43/028 370/241 |
| 2016/0182336 A1* | 6/2016 | Doctor | H04L 43/062 709/224 |
| 2016/0191545 A1* | 6/2016 | Nanda | H04L 43/028 726/1 |
| 2019/0109902 A1 | 4/2019 | Keesara et al. | |
| 2019/0222515 A1 | 7/2019 | Pignataro et al. | |

(Continued)

OTHER PUBLICATIONS

Cisco, "Catalyst Switched Port Analyzer (SPAN) Configuration Example," Jan. 22, 2019, https://www.cisco.com/c/en/us/support/docs/switches/catalyst-6500-series-switches/10570-41.html.

*Primary Examiner* — Ruolei Zong
(74) *Attorney, Agent, or Firm* — Park, Vaughan, Fleming & Dowler LLP

(57) ABSTRACT

One embodiment can provide a method and system for monitoring network traffic. During operation, the system may receive a request to monitor packets ingressing or egressing a device. The request can indicate a set of parameters for monitoring the packets. In response to receiving the request, the system may configure a network switch coupled to the device to replicate the packets ingressing or egressing the device. The system can then encapsulate the replicated packets, based on the set of parameters, with a destination address associated with the request, thereby allowing the packets to be analyzed remotely.

18 Claims, 7 Drawing Sheets

(56) References Cited

U.S. PATENT DOCUMENTS

2020/0067818 A1\* 2/2020 Jeuk .................. H04L 12/56
2021/0067564 A1\* 3/2021 J S ..................... H04L 67/02

\* cited by examiner

SYSTEM AND METHOD FOR MONITORING INGRESS/EGRESS PACKETS AT A NETWORK DEVICE

BACKGROUND

Field

This disclosure is generally related to monitoring network traffic. More specifically, this disclosure is related to a system and method for monitoring ingress/egress packets at a network device.

Related Art

The increase in size and complexity of computer networks in addition to the number of network users has resulted in an increase in the amount of network traffic. Monitoring network traffic in such large networks can be critical for ensuring proper network operation and performance. Various network traffic monitoring techniques have been used to capture and analyze the network traffic at different nodes for understanding packet behaviors and for identifying any network issues.

BRIEF DESCRIPTION OF THE FIGURES

In the figures, like reference numerals refer to the same figure elements.

DETAILED DESCRIPTION

Embodiments described herein solve the technical problem of monitoring ingress/egress packets at a network device that may not grant remote access to packet analyzing methods by using a management device coupled to the network device via a network switch to capture and send the packets to a remote network, thereby allowing packets to be analyzed remotely.

In general, various methods are available for monitoring network traffic ingressing/egressing a network device. Traditionally, a system configured to monitor network packets at a network device may first access (either locally or remotely) the network device to be monitored, e.g., by using a secure shell (ssh) command. The system can then run a network monitoring method, e.g., tcpdump, on the network device for capturing network traffic sent or received by the network device.

However, for a remote system to monitor packets ingressing/egressing the network device, it is typically necessary for the system to have remote access to the network device. Without remote access to the network device, in an event of a network malfunction (or sub-optimal performance), it may be difficult to capture the packets ingressing/egressing the network device and diagnose the cause of the malfunction. In some network environments where security is of concern, many devices may not provide easy remote access (and hence a command like tcpdump may not be executed by a remote traffic monitoring system on the device).

To solve the aforementioned problems, embodiments described herein provide a system and method for monitoring ingress/egress packets at a device in a remote network. The network device is not required to allow remote access for traffic monitoring. However, a user can monitor packets ingressing/egressing the network device by sending a request directed to a management device coupled locally to a network switch which is also coupled to the network device to be monitored. In response to the request, the management device can configure the network switch based on the user request to replicate and forward the packets ingressing/egressing the network device via the switch to the management device. The management device can encapsulate the captured packets based on the user request and send them to a remote system associated with the user, where the user can apply a packet analyzing method to the captured packets.

The term "mirroring" refers to sending a copy of network packets from one network switch port to another port of the network switch for further analysis.

The terms "mirroring" and "replicating" are used interchangeably in the present disclosure.

The phrase "ingressing packets" refers to packets entering a device.

The phrase "egressing packets" refers to packets exiting a device.

System Architecture for Monitoring Network Traffic

Figure 1:
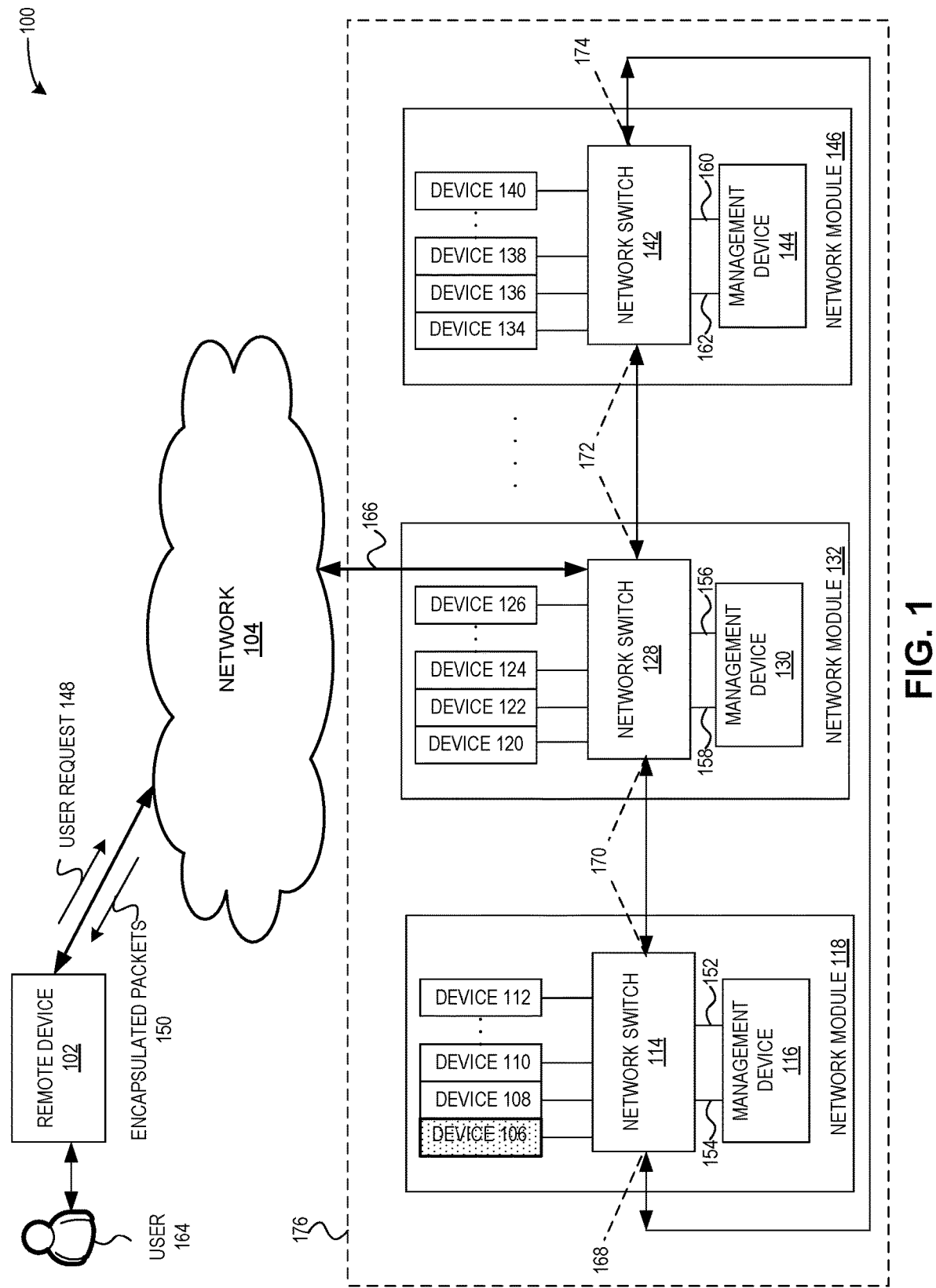
FIG. 1 illustrates an exemplary example of a system for monitoring network traffic at a network device, according to one embodiment.

FIG. 1 illustrates an exemplary example of a system for monitoring network traffic at a network device, according to one embodiment. In the example shown in FIG. 1, system 100 may include an internal management network 176 which can include a plurality of network modules 118, 132, and 146 that can be connected to each other in a ring topology using ring ports 168, 170, 172, and 174. Each network module can include a plurality of devices coupled to a network switch and a management device which can also be coupled to the network switch. For example, network module 118 can include devices 106-112 with each device coupled to network switch 114, and a management device 118 coupled to network switch 114. Packets can ingress/egress any device in network module 118 via network switch 114. In some embodiments, each device may be a server, e.g., a blade server.

Management devices 118, 130, and 144 can facilitate communication of internal management network traffic among devices 106-112, 120-126, and 134-140 via network switches 114, 128, and 142, respectively. Furthermore, each management device, i.e., 118, 130, and 144, may communicate with any device in any network module, i.e., 114, 128, and 142.

Devices 106-112, 120-126, and 134-140 can send and receive data traffic via the corresponding network switches to/from other network modules connected in the ring topology. Devices 106-112, 120-126, and 134-140 can send some part of data traffic, e.g., production traffic, via an uplink 166 to remote users via network 104. Management traffic associated with the internal management network 176 can be maintained within network 176.

When a user 164 at a remote location desires to monitor packets ingressing/egressing a device, e.g., device 106 in network module 118, the user may send a request directed to network module 118 via network 104. The user can have access to the management network via an uplink 166. However, the user may not be able to access device 106 or any other devices in network modules 118, 130, and 134 to run a typical packet analyzing method, e.g., tcpdump. This can be due to some security restrictions.

In one embodiment, a management device, e.g., 116, can receive user request 148 from remote device 102 through network 104 and via uplink 166 for monitoring packets ingressing/egressing a device in a network module 118. In response to receiving request 148, management device, i.e., 116, can instruct network switch, i.e., 114, to mirror packets to be captured. In other words, management device, e.g., 116, can facilitate the monitoring of ingress/egress packets at a device, e.g., device 106

In one embodiment, a system may provide an application programming interface (API) at remote device 102 to enable user 164 to select a device to be monitored within internal management network 174 and to select a set of parameters that can be included in user request 148. Table 1 below shows a list of the set of parameters that can be included in user request 148.

TABLE 1

Parameters included in user request 148

| | PARAMETERS | DESCRIPTION |
|---|---|---|
| 1. | Device Identifier | Indicates a device to be monitored. |
| 2. | Media Access Control (MAC) address | MAC address of the device. |
| 3. | Internet Protocol (IP) address | IP address of the device. |
| 4. | Transmission Control Protocol (TCP) port number or Destination User Datagram Protocol (UDP) port number | TCP or UDP port number of the device. |
| 5. | Packet type | Indicates a type of packet to monitor, e.g., Ingress/Egress/both type of packets. |
| 6. | Portion indicator | Indicates a part of the packet to capture, e.g., a part associated with L2/L3/L4 layer, and a part or size of payload to be captured. |
| 7. | Destination MAC address | MAC address of a remote device sending a request to monitor. |
| 8. | Destination IP address | IP address of a remote device sending the request to monitor. |
| 9. | TCP or UDP port number | TCP or UDP port number associated with remote device for use by a packet monitor application on the remote device. |

When user request 148 is directed to network module 118, user request 148 can be sent through network 104 towards uplink 166 and via network switches 128 and 114 to management device 116. Network switches 128 and 114 can be part of internal management network 176 which can have a ring topology and can be connected through ring port 170. Management device 116 can receive user request 148 from network switch 114, via an ethernet interface 152. In response to receiving user request 148, management device 116 can identify a device to be monitored as specified by user request 148.

Management device 116 can then configure network switch 114 to start mirroring packets ingressing/egressing device 106. In one embodiment, packets ingressing/egressing device 106 via network switch 114 may be management traffic for internal management network 176. Management device 116 can further configure network switch 114 to forward the mirrored packets via a Peripheral Component Interconnect (PCI) interface 154, via which management device 116 can receive these packets.

Next, management device 116 can match each packet forwarded by network switch 114 with one or more parameters (see Table 1) specified in user request 148. For example, management device 116 can determine whether the received packets match a MAC address, IP address, and/or TCP or UDP port number. When no match is found, management device 116 can drop the packets. When a match is found, management device 116 can further process the matched packets.

Management device 116 can then filter the matched packets based on one or more parameters specified in user request 148 (see Table 1). For example, the parameters can include a type of packet to capture, e.g., egress packets, or ingress packets, or both. For example, when user request 148 indicates that only packets ingressing device 106 are to be captured, management device 116 can capture only the ingress packets and can drop the egress packets.

Management device 116 can then optionally extract a requested part of each packet from the filtered packets based on some parameters indicated in user request 148. For example, user request 148 can indicate that the entire packet is to be captured or can also specify either a L2-layer/L3-layer/L4-layer part of the packet is to be captured. In other words, packets captured by management device 116 can include layer-2 and up fields. User 164 may or may not be interested in the layer-2 information. In such cases, user 164 can indicate this in user request 148, and accordingly management device 116 may drop the layer-2 portion of the captured packets. In addition, user request 148 can also indicate a part or size of the payload to be captured.

Management device 116 can then encapsulate the extracted part of each packet into a new packet. Specifically, the extracted packet can be included as a new payload in the new packet. The new packet can further include additional parameters specified in user request 148. For example, user request 148 can include information associated with a destination device to which the encapsulated packets are to be sent. In other words, user request 148 can specify a destination IP address, and a destination TCP or UDP port number associated with remote device 102. Prior to sending user request 148, user 164 may configure the corresponding TCP or UDP port on remote device 102 to receive encapsulated packets 150.

Management device 116 can include the additional parameters associated with remote device 102 in the header of the new packet to generate an encapsulated packet and can send encapsulated packets 150 to remote device 102 via ethernet interface 152 to network switch 114, ring ports 170, network switch 128, uplink 166, and via network 104.

Management device 116 can continue to capture and forward encapsulated packets to remote device 102 until remote user 164 sends another request, e.g., a stop request, to stop the packet capturing process. In addition, the stop request may include a request to disable switch port mirroring and forwarding of packets to management device 116.

In one embodiment, management device 116 can discontinue the packet capturing process, disable the switch port mirroring and forwarding of packets when a timer maintained by management device 116 has reached a pre-specified time.

At remote device 102, user 164 may perform packet analyzing methods to analyze received encapsulated packets 150 to identify any network issues associated with internal management network 176. The above-described operations performed by management device 116 can also be performed by management devices 130 and 144 when user request 148 includes device information related to devices in network module 132 or 146, respectively. In network module 132, management device 130 can be coupled to switch 128 via PCI interface 158 or ethernet interface 156. Similarly, in network module 146, management device 144 can be coupled to switch 142 via PCI interface 162 or ethernet interface 160.

Figure 2:
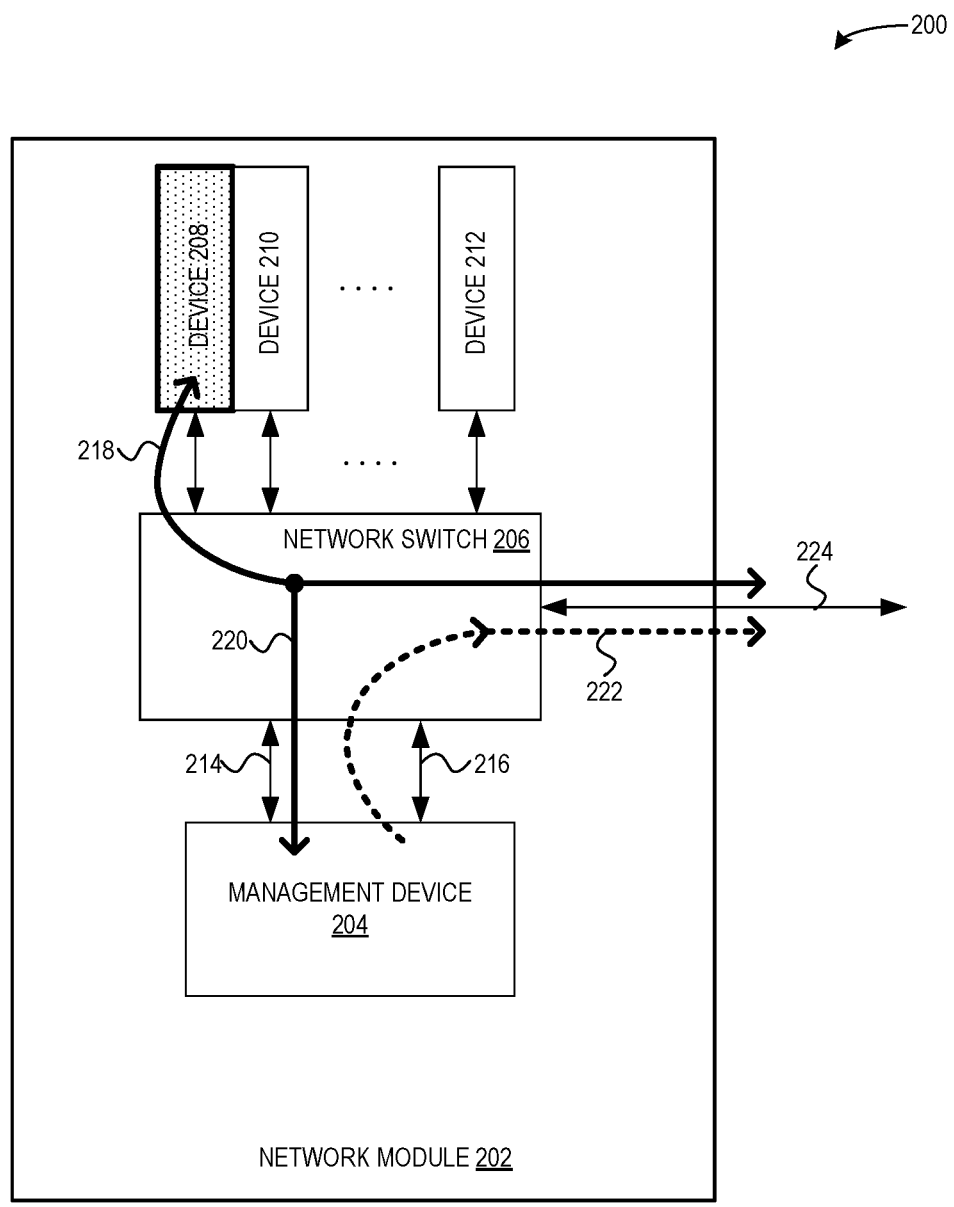
FIG. 2 illustrates an exemplary configuration for capturing packets ingressing/egressing a network device via a network switch, according to one embodiment.

FIG. 2 illustrates an exemplary configuration for capturing packets ingressing/egressing a network device via a network switch, according to one embodiment. In example 200 shown in FIG. 2, a management device 204 in a network module 202 may receive a user request for monitoring network packets 218 ingressing/egressing a device 208. Packets 218 ingressing/egressing device 208 may correspond to internal management traffic received from other network modules connected to network module 202 in an internal management network. In response to receiving the user request, management device 204 may configure network switch 206 to mirror packets 218 ingressing/egressing device 208 and forward a copy of packets 218 to management device 204 via a PCI interface 214.

Network switch 206 may copy and forward packets 218 via PCI interface 214 without modifying the packets. In other words, no portion of a packet from among forwarded packets 220 is dropped or changed. A packet may include information up to its layer-2 header. Management device 204 can process received packets 220 based on a set of parameters specified in the user request (see Table 1) and can create a new packet by encapsulating the processed packets in new headers addressed to a destination remote device. Management device 204 can then send encapsulated packets 222 towards the remote device. At the remote device, a user may monitor the packets received from management device 204 via a network, e.g., a wide area network (WAN) or a customer network, and apply packet analyzing methods. Therefore, a user at a remote device can troubleshoot any network issues associated with device 208 that may not provide remote access permissions to the user.

Figure 3:
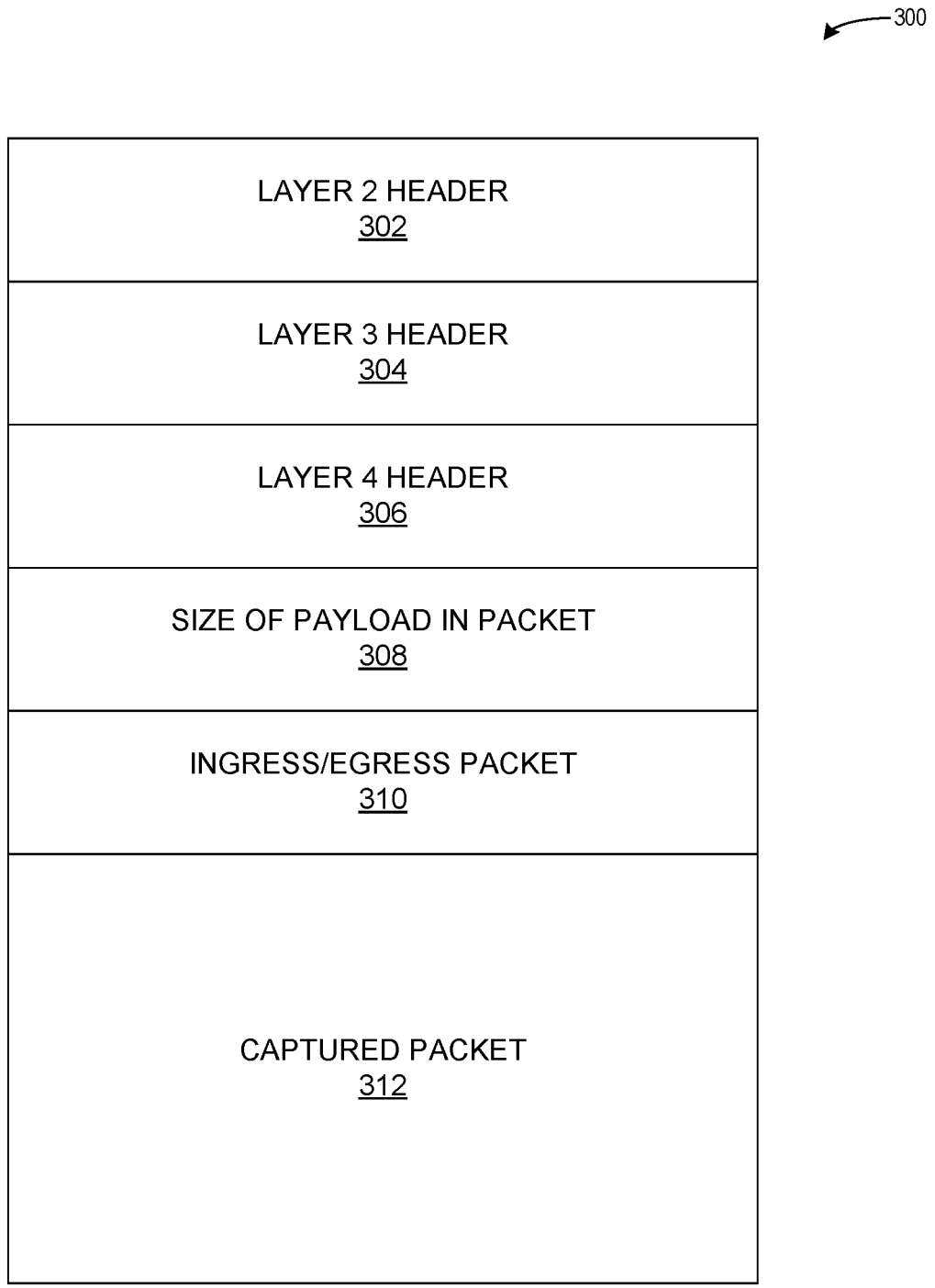
FIG. 3 illustrates an exemplary encapsulated packet, according to one embodiment.

FIG. 3 illustrates an exemplary encapsulated packet, according to one embodiment. A management device can encapsulate a captured packet 312 associated with a device to be monitored with a set of header fields. Specifically, encapsulated packet 300 may include one or more fields to identify a remote device for sending the encapsulated packet. For example, encapsulated packet 300 can include one or more of: a layer-2 header 302 specifying a MAC address of the remote device, a layer-3 header 304 specifying an IP address of the remote device, and a layer-4 header 306 specifying a TCP or UDP port at which the remote device is configured to receive encapsulated packet 300. For example, a remote user can configure a packet monitoring application running on a machine to monitor all packets received at a UDP port specified in layer-4 header 306 of encapsulated packet 300. Encapsulated packet 300 can further include a field 308 to indicate a size of payload included in captured packet 312, and a field 310 to indicate whether captured packet 312 is an ingress/egress packet associated with the device being monitored.

Figure 4A:
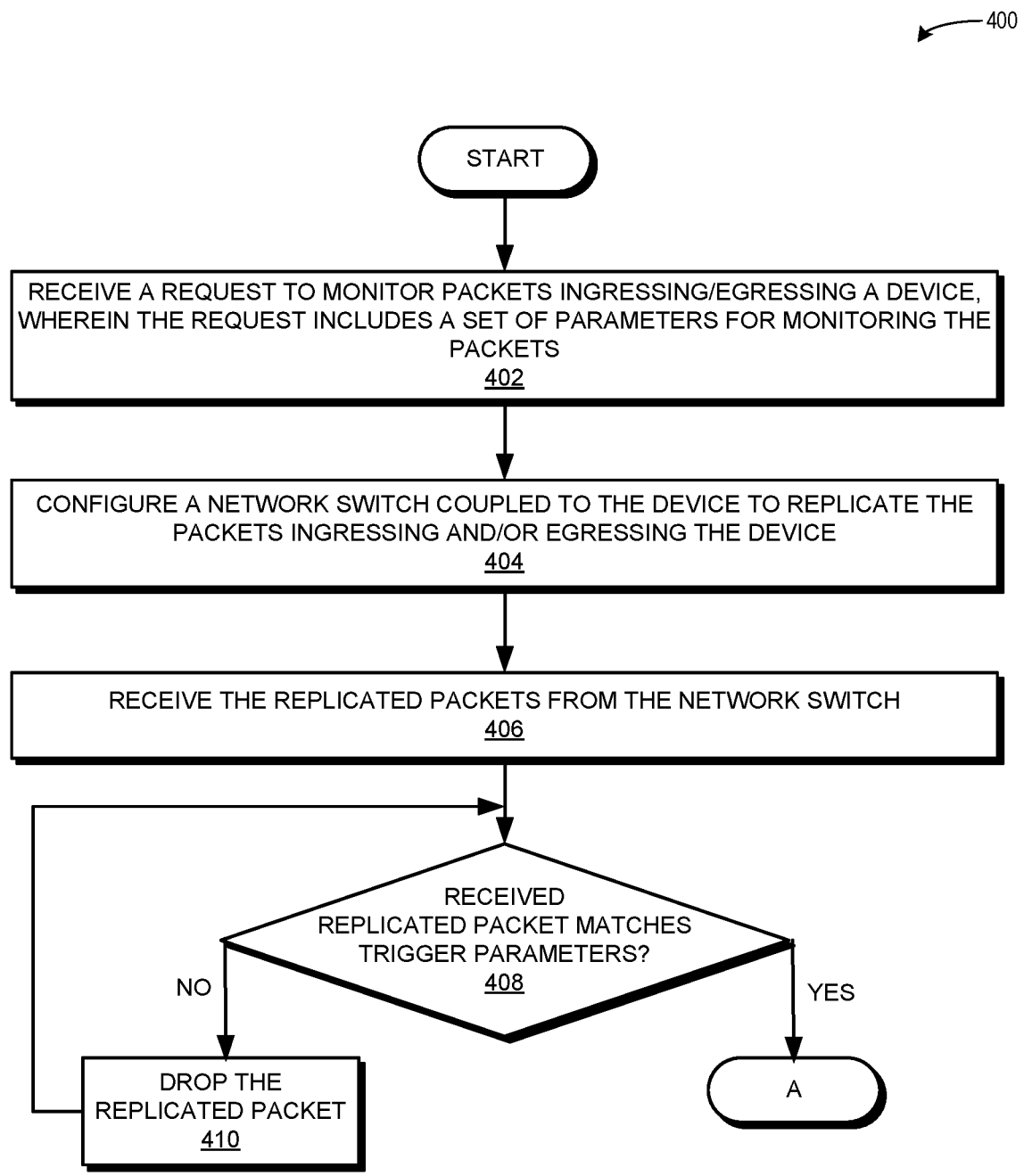
FIG. 4A presents a flowchart illustrating a process for monitoring ingress/egress packets at a network device, according to one embodiment.
Figure 4B:
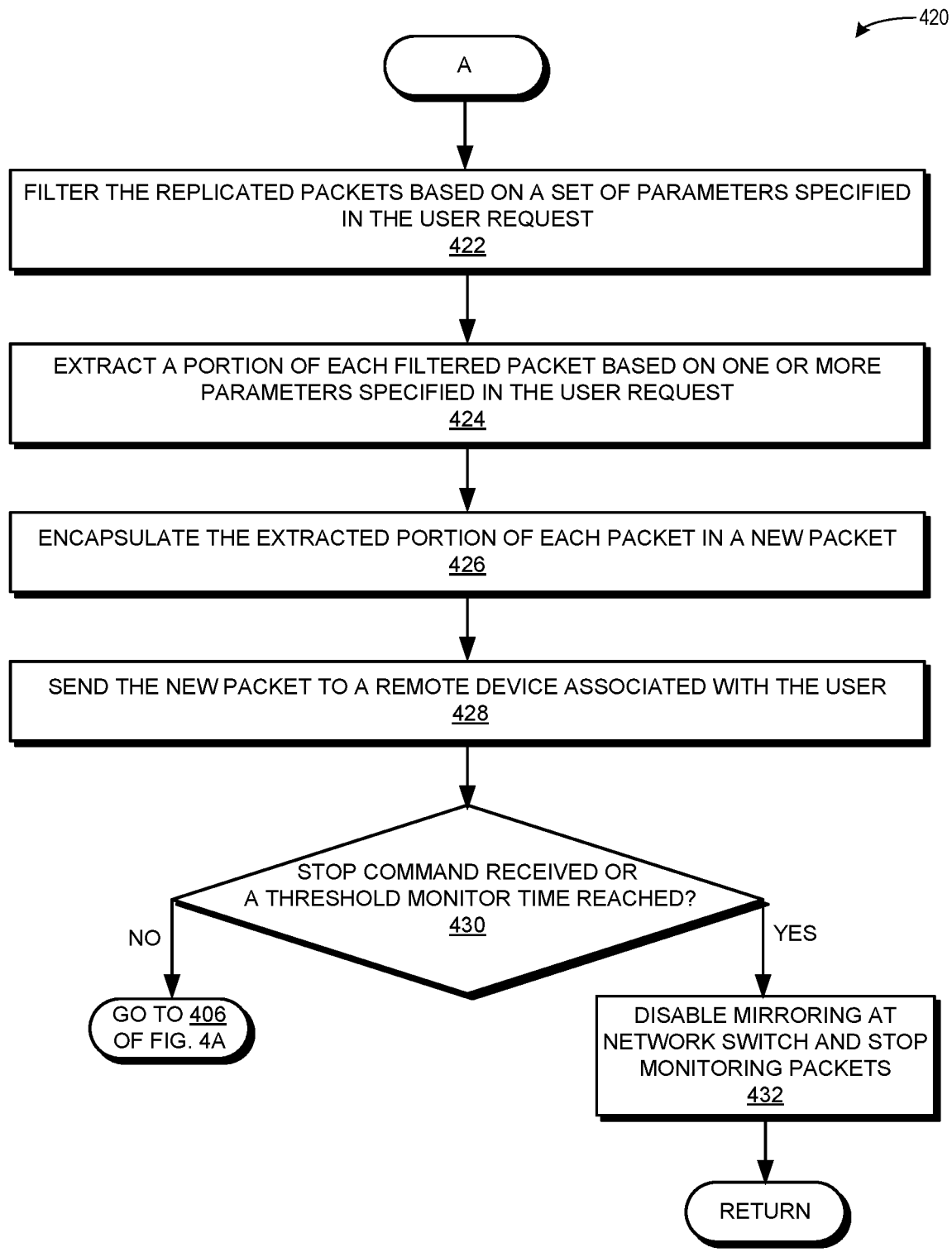
FIG. 4B presents a flowchart illustrating a process for monitoring ingress/egress packets at a network device, according to one embodiment.

FIGS. 4A and 4B present flowcharts illustrating a process for monitoring ingress/egress packets at a network device, according to one embodiment. Referring to FIG. 4A, during operation, a system my receive a user request to monitor packets ingressing/egressing a device (operation 402). The system can use a set of parameters included in the user request to capture the packets. In response to receiving the user request, the system can configure a network switch coupled to the device to replicate the packets ingressing/egressing the device based on the set of parameters specified in the user request (operation 404). After the network switch is configured, the network switch can start replicating and forwarding the packets ingressing/egressing the device.

The system can then receive the replicated packets forwarded by the network switch (operation 406). The system can start processing the received replicated packets by matching each replicated packet with one or more trigger parameters specified in the user request (operation 408). For example, the one or more trigger parameters can include a MAC address of the device, an IP address, and/or a TCP port number of the device (shown in Table 1). In other words, the system may capture only those packets that originated from or is destined to the device to be monitored.

When match operation in 408 is not satisfied, i.e., the packets received by the system do not match the trigger parameters, the system may drop such packets (operation 410) and can then continue to operation 408 for matching the next replicated packet. When match operation in 408 is satisfied, the system can continue operation at label A.

Referring to FIG. 4B, in response to the system matching the replicated packets based on the one or more trigger parameters, the system can filter the replicated packets based on a set of parameters specified in the user request (operation 422). For example, the system can use parameters (shown in Table 1) specified in the user request to perform the filtering. Specifically, when the user request indicates that only ingress packets are to be captured then the system can filter out all the egress packets and retain only the ingress packets.

The system can then optionally extract a portion of each filtered packet based on one or more parameters specified in the user request (operation 424). For example, if the user sends a request for packets including only layer-4 information then the system may remove layer-2 and layer-3 related information from the packet. In addition, the system can extract a portion of the payload in the captured packet based on the payload size indicated in the user request. The system can then encapsulate the extracted part of each packet in a new packet (operation 426). Next, the system can send the encapsulated packets to a remote device associated with a remote user (operation 428), thereby allowing the packets ingressing/egressing a device to be analyzed remotely.

When the system receives a stop request including a stop command or when the system detects that a threshold monitor time has been reached (operation 430), the system can re-configure the network switch to disable mirroring of packets and the system can stop monitoring packets (operation 432) and the operation returns. When the condition in operation 430 is not satisfied, i.e., no stop command is received or a threshold monitor time is not reached, the system can continue to operation 406 in FIG. 4A.

Exemplary Computer System and Apparatus

Figure 5:
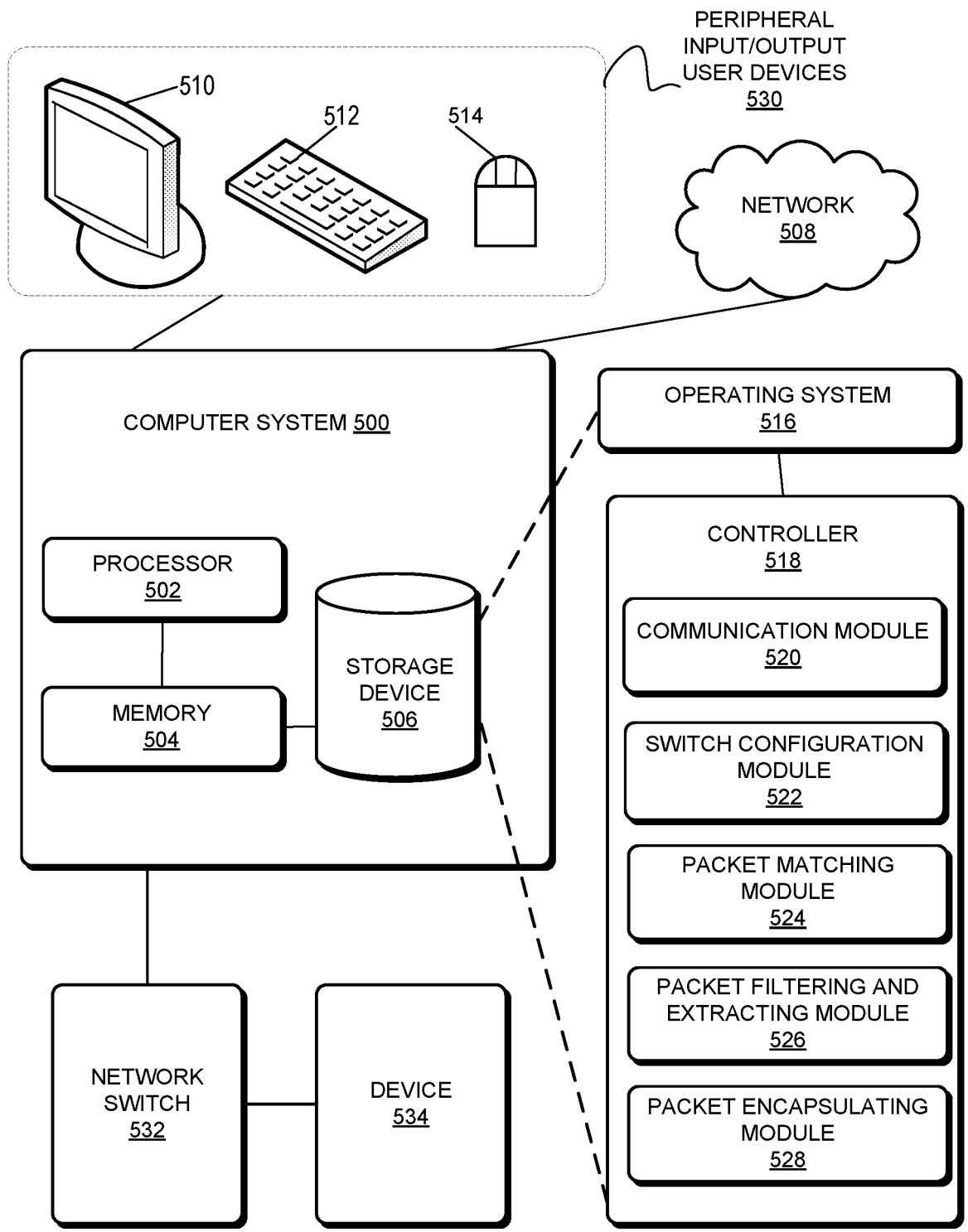
FIG. 5 illustrates an exemplary computer system that facilitates the monitoring of ingress/egress packets at a network device, according to one embodiment.

FIG. 5 illustrates an exemplary computer system that facilitates the monitoring of ingress/egress packets at a network device, according to one embodiment. In this example, computer system 500 can include a processor 502, a memory 504, and a storage device 506. Computer system 500 can be coupled to peripheral input/output (I/O) user devices 530, e.g., a display device 510, a keyboard 512, and a pointing device 514, and can also be coupled via one or more network interfaces to network 508. Storage device 506 can store instructions for an operating system 516 and a controller 518. Computer system 500 can communicate with a device 534 via a network switch 532.

In one embodiment, controller 518 can include instructions, which when executed by processor 502 can cause computer system 500 to perform methods and/or processes described in this disclosure. Controller 518 can include a communication module 520 to receive a request via network 508 for monitoring packets ingressing/egressing network device 534. Controller 518 can further include instructions implementing a switch configuration module 522 for configuring network switch 532 to replicate and forward packets ingressing/egressing device 534.

Controller 518 can include a packet matching module 524, which can match each packet replicated and forwarded by network switch 532 with one or more trigger parameters specified in a user request. The one or more trigger parameters can include a MAC address, an IP address, and a TCP or UDP port number associated with device 534. When packet matching module 524 identifies a match, the packets can be subject to further processing. However, when packet match module 524 does not identify any match for a packet, the packet can be dropped. Controller 518 can also include a packet filtering and extracting module 526 for filtering the matched packets and then extracting a portion of each filtered packet. For example, packet filtering and extracting module 526 can filter the matched packets based on one or more parameters specified in the user request and then extract portions of the filtered packets. Specifically, the one or more parameters can indicate whether only egress/ingress/ both type of packets are to be captured and can indicated a portion of each packet to be extracted. Controller 518 can further include a packet encapsulating module 528 to encapsulate the filtered and extracted portion of each packet in a new packet and communication module 520 to send the encapsulated packets to a remote device via network 508 for analyzing the encapsulated packets.

Communication module 520 can further receive a stop request from a remote user via network 508. Optionally, controller 518 can also include instructions to determine whether a threshold monitor time value has been reached. In response to receiving the stop request or determining that the threshold monitor time has been reached, switch configuration module 522 can configure the switch to discontinue packet mirroring.

Figure 6:
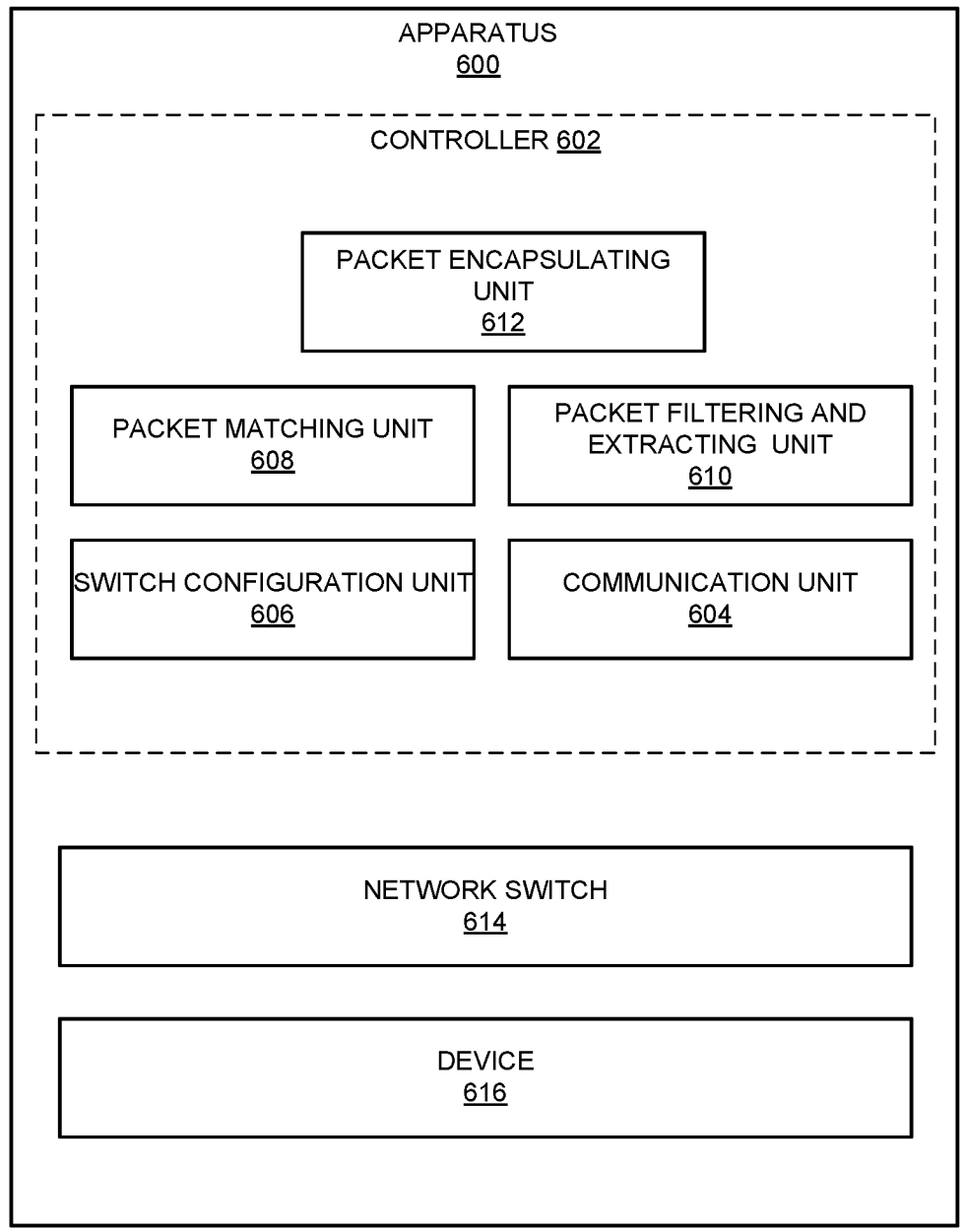
FIG. 6 illustrates an exemplary apparatus that facilitates the monitoring of ingress/egress packets at a network device, according to one embodiment.

FIG. 6 illustrates an exemplary apparatus that facilitates the monitoring of ingress/egress packets at a network device, according to one embodiment. Apparatus 600 can include units 604-612, which perform functions or operations similar to modules 520-528 of computer system 500 in FIG. 5, respectively. Apparatus 600 can include a controller 602 which can further include: a communication unit 604, a switch configuration unit 606, a packet matching unit 608, a packet filtering and extracting unit 610, and a packet encapsulating unit 612. Apparatus 600 can further include a network switch 614, and a device 616 to be monitored.

One embodiment described in the present disclosure can provide a method and system for monitoring network traffic. During operation, the system may receive a request to monitor packets ingressing or egressing a device. The request can indicate a set of parameters for monitoring the packets. In response to receiving the request, the system may configure a network switch coupled to the device to replicate the packets ingressing or egressing the device. The system can then encapsulate the replicated packets, based on the set of parameters, with a destination address associated with the request, thereby allowing the packets to be analyzed remotely.

In a variation on this embodiment, the set of parameters can include one or more trigger parameters for monitoring the replicated packets. The system can match the one or more trigger parameters with one or more parameters in each replicated packet. The system can further capture the replicated packet when a match is identified and drop the replicated packet when no match is identified.

In a variation on this embodiment, the one or more trigger parameters may include a MAC address of the device, an IP address of the device, and a TCP or UDP port number of the device.

In a variation on this embodiment, the set of parameters can include one or more of: a MAC address corresponding to a remote machine associated with the request; an IP address corresponding to the remote machine associated with the request; a TCP or UDP port number corresponding to the remote machine associated with the request; an identifier for the device; a packet type to indicate whether ingress packets, egress packets, or both are to be monitored; a portion indicator which indicates a portion of payload of packets to be captured; and one or more trigger parameters.

In a further variation, the system can encapsulate the replicated packets by: filtering the replicated packets based on the set of parameters specified in the request; extracting a portion of a respective filtered packet to match one or more parameters specified with the request; and creating a new packet to include the extracted portion.

In a further variation, the system can receive a stop request to discontinue monitoring packets associated with the device. The system can then configure the network switch to discontinue replicating of the packets.

In a further variation, the system can receive the request from a first network, wherein the device and the network switch can reside in a second network, and wherein the encapsulated packets can be sent to the first network via a wide area network (WAN).

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

What is claimed is:

1. A method for monitoring network traffic, the method comprising:
   receiving a request to monitor packets ingressing or egressing a device, wherein the request indicates a set of parameters for monitoring the packets, wherein the set of parameters include one or more trigger parameters for monitoring the replicated packets;
   configuring a network switch coupled to the device to replicate the packets ingressing or egressing the device;
   encapsulating the replicated packets, based on the set of parameters, with a destination address associated with the request, thereby allowing the packets to be analyzed remotely;
   matching the one or more trigger parameters with one or more parameters in each replicated packet;
   capturing the replicated packet when a match is identified; and
   dropping the replicated packet when no match is identified.

2. The method of claim 1, wherein the one or more trigger parameters include one or more of: a MAC address of the device; an IP address of the device; and a TCP or UDP port number of the device.

3. The method of claim 1, wherein the set of parameters include one or more of:
   a MAC address corresponding to a remote machine associated with the request;
   an IP address corresponding to the remote machine associated with the request;
   a TCP or UDP port number corresponding to the remote machine associated with the request;
   an identifier for the device;
   a packet type to indicate whether ingress packets, egress packets, or both are to be monitored;
   a portion indicator which indicates a portion of payload of packets to be captured; and
   one or more trigger parameters.

4. The method of claim 1, wherein encapsulating the replicated packets further comprises:
   filtering the replicated packets based on the set of parameters specified in the request;
   extracting a portion of a respective filtered packet to match one or more parameters specified with the request; and
   creating a new packet to include the extracted portion.

5. The method of claim 1, further comprising:
   receiving a stop request to discontinue monitoring packets associated with the device; and
   configuring the network switch to discontinue replicating of the packets.

6. The method of claim 1, wherein the request is received from a first network, wherein the device and the network switch reside in a second network, and wherein the encapsulated packets are sent to the first network via a wide area network (WAN).

7. A computer system, comprising:
   a processor; and
   a storage device coupled to the processor and storing instructions, which when executed by the processor cause the processor to perform a method for monitoring network traffic, the method comprising:
   receiving a request to monitor packets ingressing or egressing a device, wherein the request indicates a set of parameters for monitoring the packets, wherein the set of parameters include one or more trigger parameters for monitoring the replicated packets;
   configuring a network switch coupled to the device to replicate the packets ingressing or egressing the device;
   encapsulating the replicated packets, based on the set of parameters, with a destination address associated with the request, thereby allowing the packets to be analyzed remotely;
   matching the one or more trigger parameters with one or more parameters in each replicated packet;
   capturing the replicated packet when a match is identified; and
   dropping the replicated packet when no match is identified.

8. The computer system of claim 7, wherein the one or more trigger parameters include one or more of: a MAC address of the device; an IP address of the device; and a TCP or UDP port number of the device.

9. The computer system of claim 7, wherein the set of parameters include one or more of:
   a MAC address corresponding to a remote machine associated with the request;
   an IP address corresponding to the remote machine associated with the request;
   a TCP or UDP port number corresponding to the remote machine associated with the request;
   an identifier for the device;
   a packet type to indicate whether ingress packets, egress packets, or both are to be monitored;
   a portion indicator which indicates a portion of payload of packets to be captured; and
   one or more trigger parameters.

10. The computer system of claim 7, wherein encapsulating the replicated packets further comprises:
    filtering the replicated packets based on the set of parameters specified in the request;
    extracting a portion of a respective filtered packet to match one or more parameters specified with the request; and
    creating a new packet to include the extracted portion.

11. The computer system of claim 7, wherein the method further comprises:
    receiving a stop request to discontinue monitoring packets associated with the device; and
    configuring the network switch to discontinue replicating of the packets.

12. The computer system of claim 7, wherein the request is received from a first network, wherein the device and the network switch reside in a second network, and wherein the encapsulated packets are sent to the first network via a wide area network (WAN).

13. An apparatus for monitoring network traffic, comprising:
    a device to be monitored;
    a network switch coupled to the device; and
    a controller coupled to the device via the network switch, wherein the controller is configured to:

receive a request to monitor packets ingressing or egressing the device, wherein the request indicates a set of parameters for monitoring the packets, wherein the set of parameters include one or more trigger parameters for monitoring the replicated packets;

configure the network switch to replicate the packets ingressing or egressing the device;

encapsulate the replicated packets, based on the set of parameters, with a destination address associated with the request, thereby allowing the packets to be analyzed remotely;

match the one or more trigger parameters with one or more parameters in each replicated packet;

capture the replicated packet when a match is identified; and drop the replicated packet when no match is identified.

14. The apparatus of claim 13, wherein the one or more trigger parameters include one or more of: a MAC address of the device; an IP address of the device; and a TCP or UDP port number of the device.

15. The apparatus of claim 13, wherein the set of parameters include one or more of:
a MAC address corresponding to a remote machine associated with the request;
an IP address corresponding to the remote machine associated with the request;
a TCP or UDP port number corresponding to the remote machine associated with the request;
an identifier for the device;
a packet type to indicate whether ingress packets, egress packets, or both are to be monitored;
a portion indicator which indicates a portion of payload of packets to be captured; and
trigger parameters.

16. The apparatus of claim 13, wherein the controller is configured to encapsulate the replicated packets by:
filtering the replicated packets based on the set of parameters specified in the request;
extracting a portion of a respective filtered packet to match one or more parameters specified with the request; and
creating a new packet to include the extracted portion.

17. The apparatus of claim 13, wherein the controller further configured to:
receive a stop request to discontinue monitoring packets associated with the device; and
configure the network switch to discontinue replicating of the packets.

18. A method for monitoring network traffic, the method comprising:
receiving a request to monitor packets ingressing or egressing a device, wherein the request indicates a set of parameters for monitoring the packets;
configuring a network switch coupled to the device to replicate the packets ingressing or egressing the device; and
encapsulating the replicated packets, based on the set of parameters, with a destination address associated with the request, thereby allowing the packets to be analyzed remotely, wherein the request is received from a first network, wherein the device and the network switch reside in a second network, and wherein the encapsulated packets are sent to the first network via a wide area network (WAN).

* * * * *